(12) United States Patent
Frankenstein et al.

(10) Patent No.: US 8,747,053 B2
(45) Date of Patent: Jun. 10, 2014

(54) METHOD FOR PRODUCING A LUBRICANT FEED LINE OF A THRUST BEARING

(75) Inventors: Dirk Frankenstein, Worms (DE); Dag Hauschild, Offenburg (DE); Johann Hauser, Bernhardswald (DE); Jochen Held, Bolanden-Weierhof (DE); Stefan Nowack, Kirchheimbolanden (DE); Konrad Viessmann, Kalchreuth (DE)

(73) Assignee: Continental Automotive GmbH, Hannover (DE)

( * ) Notice: Subject to any disclaimer, the term of this patent is extended or adjusted under 35 U.S.C. 154(b) by 1076 days.

(21) Appl. No.: 12/740,738

(22) PCT Filed: Sep. 16, 2008

(86) PCT No.: PCT/EP2008/062282
§ 371 (c)(1), (2), (4) Date: Nov. 22, 2010

(87) PCT Pub. No.: WO2009/056393
PCT Pub. Date: May 7, 2009

(65) Prior Publication Data
US 2011/0052389 A1 Mar. 3, 2011

(30) Foreign Application Priority Data
Oct. 31, 2007 (DE) .......................... 10 2007 052 102

(51) Int. Cl.
*F01D 3/00* (2006.01)
*F01D 3/04* (2006.01)

(52) U.S. Cl.
USPC ........................................................ 415/104

(58) Field of Classification Search
USPC ........ 184/100, 6.12, 6.11; 29/527.3, 898.041, 29/898.12, 898.13, 889.2; 415/104–107, 415/170.1, 229
See application file for complete search history.

(56) References Cited

U.S. PATENT DOCUMENTS

| | | | |
|---|---|---|---|
| 3,597,027 A * | 8/1971 | Herndon | ........................ 384/305 |
| 4,639,148 A | 1/1987 | Tamura et al. | |
| 4,795,220 A | 1/1989 | Mori | |
| 5,308,169 A * | 5/1994 | Baker et al. | ...................... 384/99 |
| 6,122,951 A * | 9/2000 | Arbesman | ........................ 72/377 |
| 2004/0168319 A1* | 9/2004 | Mielke | ........................ 29/888.04 |
| 2006/0018578 A1* | 1/2006 | Krauss et al. | .................. 384/420 |

FOREIGN PATENT DOCUMENTS

| | | |
|---|---|---|
| CH | 399840 A | 9/1965 |
| DE | 3706571 A1 | 9/1988 |
| DE | 3901265 A1 | 7/1990 |
| DE | 69309860 T2 | 7/1997 |
| EP | 1452250 A2 | 9/2004 |

(Continued)

*Primary Examiner* — Edward Look
*Assistant Examiner* — Christopher J Hargitt
(74) *Attorney, Agent, or Firm* — Laurence A. Greenberg; Werner H. Stemer; Ralph E. Locher

(57) ABSTRACT

A method for producing a lubricant feed in an axial bearing, wherein the lubricant feed is designed as a channel guiding lubricant from a lubricant pocket of the axial bearing, includes the following steps: preparing an initial axial bearing mold, stamping a groove in the area of the initial mold in which the channel is planned; embossing and putting through material on at least one or both sides of the groove along at least one segment of the groove; stamping the material on the side of the groove toward the groove so that the material and the groove form the channel.

4 Claims, 2 Drawing Sheets

(56) References Cited

FOREIGN PATENT DOCUMENTS

| | | | |
|---|---|---|---|
| EP | 1619356 | A1 | 1/2006 |
| GB | 710958 | A | 6/1954 |
| JP | 58001404 | A | 1/1983 |
| JP | 60154824 | A | 8/1985 |
| JP | 61202647 | U | 12/1986 |
| JP | 6212990 | A | 8/1994 |
| JP | 2005262278 | A | 9/2005 |

* cited by examiner

A-A

1) Base material

2) Stamp groove

3) Punch through material

4) Stamp material together

5) Level surface

METHOD FOR PRODUCING A LUBRICANT FEED LINE OF A THRUST BEARING

BACKGROUND OF THE INVENTION

Field of the Invention

The invention relates to a method for producing a lubricant feed line of a thrust bearing and a thrust bearing which can be used in particular for turbochargers, in motor vehicles for example.

Turbochargers generally serve to improve the efficiency of a combustion engine and consequently to increase its performance. For this purpose a shaft is rotatably mounted, for example by means of two radial bearings, around the longitudinal axis in the casing of the turbocharger. A turbine wheel and a compressor wheel are accordingly arranged on the shaft. Strong axial forces can occur due to fluid flows which impinge on the turbine wheel and the compressor wheel. Generally such axial forces cannot be suitably absorbed by the radial bearings. For this reason at least one or two additional thrust bearings are normally provided in order to absorb these axial forces.

Very high demands are normally placed on the mounting of the shaft of a turbocharger. Thus, the turbocharger is exposed to high temperatures, since hot exhaust gas, for example, is used to drive the turbine wheel. Furthermore the shaft of a turbocharger reaches very high rotational speeds of, for example, up to 300,000 rpm. As a result of this the rotating parts of the turbocharger must be very precisely balanced in order to minimize the occurrence of vibrations.

An axial or thrust bearing is known from the prior art, as disclosed in DE 693 09 860 T2. In this case the thrust bearing is a relatively thin and substantially cylindrical part having flat opposite faces and a cutout groove at its bottom edge. The thrust bearing is also equipped with an oil reservoir. The oil reservoir is in effect an oblong blind slot which is formed in the main body portion of the thrust bearing and does not extend completely through the thrust bearing. The oil reservoir communicates with a central bore by means of a drilled passageway.

However, thrust bearings as disclosed in DE 693 09 860 T2 in which an external oil pocket is connected via a drilled bore to a central bore located further inward toward the interior for the purpose of delivering oil have the disadvantage in production that chips (swarf) and burrs form. The drilled bore can therefore be very easily blocked by the metal chips if these are not removed cleanly. Furthermore, burrs which can form at the drilled bore can likewise lead to a constriction of the drilled bore if in this case the burrs protrude into the drilled bore.

Furthermore, EP 1 619 356 discloses a thrust bearing having an essentially disk-shaped bearing body with a central passageway opening for the shaft. The thrust bearing additionally has at least one bearing surface surrounding the passageway opening for a collar which is disposed on the shaft. In this arrangement an oil supply channel is provided which extends from a radially outer region of the bearing body to the passageway opening. The oil supply channel is in this case embodied in the form of a groove which can be produced by means of a drop forging, milling or punching method.

BRIEF SUMMARY OF THE INVENTION

Accordingly it is the object of the present invention to provide an alternative method for embodying a lubricant feed line of a thrust bearing, wherein the lubricant feed line cannot be blocked by burrs or swarf.

This object is achieved by means of a method having the features recited in claim 1.

Accordingly, a method for producing a lubricant feed line in a thrust bearing is inventively provided, wherein the lubricant feed line is embodied as a channel which guides lubricant from a lubricant pocket of the thrust bearing, said method comprising the steps of:
provide an initial thrust bearing mold,
stamping a groove in the area of the initial mold in which provision is made for the channel,
stamping and punching through material on at least one side or on both sides of the groove along at least one section of the groove,
stamping the material on the side of the groove toward the groove such that the material together with the groove forms the channel.

In this case the method has the advantage that a channel can be embodied as a lubricant feed line, in particular also an at least partially or completely closed channel, in which no swarf or burrs which can constrict or block the channel are produced as a result of the production method. The lubricating function of the thrust bearing by means of the lubricant feed line or, as the case may be, the channel can thus be ensured.

Advantageous embodiments and developments of the invention will emerge from the dependent claims as well as from the description with reference to the drawings.

According to an embodiment of the invention, step d) entails stamping the material on one side or on both sides of the groove so far toward the groove that the material together with the groove forms an open, at least partially closed or completely closed channel. In this way a swarfless method involving no cutting can be used to form channels which replace the drilled channels known from the prior art in which chips and burrs can be produced during the drilling operation.

In a further embodiment variant according to the invention the method comprises the additional step of leveling the surface of the channel such that the thrust bearing has a plane channel. In this way, according to function and intended use, a thrust bearing can be provided which is embodied as essentially flat or planar, the thrust bearing being able to be embodied in this case as planar either over the entire surface area or in regions such as the lubricant feed line or the channel, for example.

In another embodiment variant according to the invention the channel is stamped in the thrust bearing to a depth that is sufficient to connect a lubricant pocket to a segment section on the same side and/or on the opposite side of the thrust bearing. In this way the segment sections can be provided with lubricant on two sides of the thrust bearing, with only one channel having to be provided. Additional manufacturing costs can be saved as a result.

According to a further inventive embodiment variant a thrust bearing is provided having at least one lubricant feed line that is produced in accordance with the inventive method. A thrust bearing of said kind has the advantage that the lubricant feed line has no burrs or swarf, in particular when the lubricant feed line is embodied as partially or completely closed. If the lubricant feed line is produced by drilling in the manner known from the prior art, this is only possible with additional overhead.

The invention is explained in more detail below with reference to the exemplary embodiments depicted in the schematic figures of the drawings, in which:

DESCRIPTION OF THE INVENTION

Unless expressly stated otherwise, identical or functionally identical elements and devices have been labeled by the same reference signs in all the figures.

Figure 1:
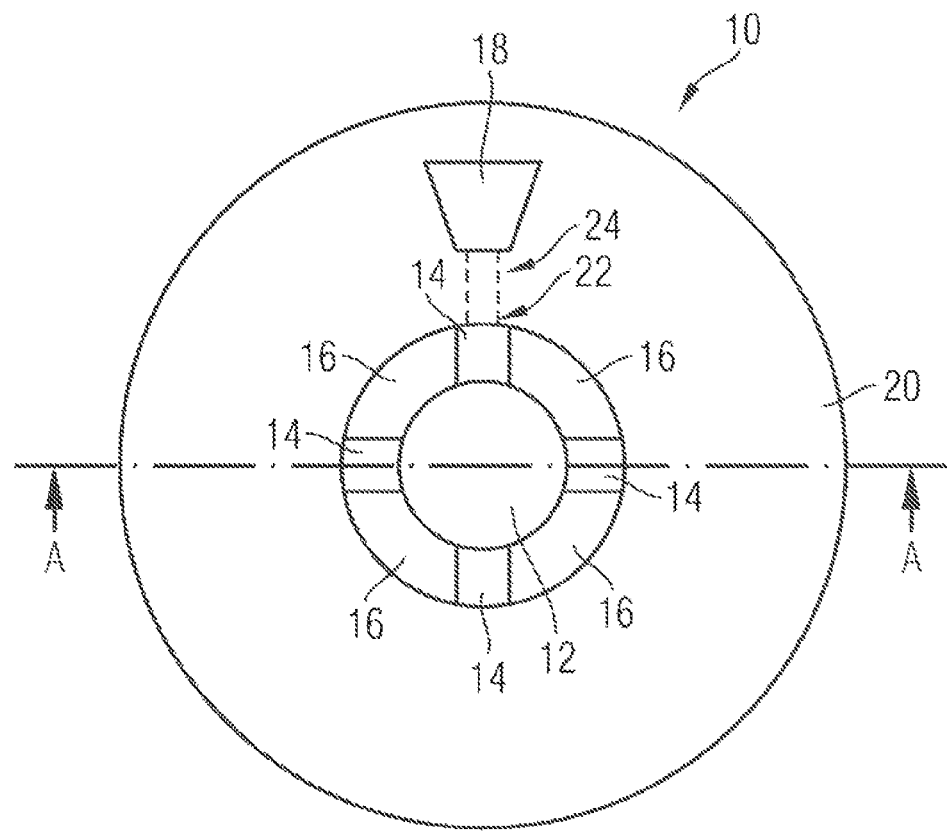
FIG. 1 shows a plan view onto a thrust bearing according to the prior art.

FIG. 1 shows a perspective plan view of an example of a thrust bearing 10 according to the prior art.

In this case the thrust bearing 10 has a central passageway opening 12 in which e.g. the shaft (not shown) of a turbocharger is brought through. In addition a segment area 14 is arranged around the passageway opening 12 of the thrust bearing 10. In this arrangement the segment area 14 has, for example, four segments 16 which form contact surfaces. The segments 16 are embodied herein as, for example, wedge-shaped and are arranged radially around the passageway opening 12. In addition the segments 16 can also be provided with a bevel.

At least one lubricant pocket 18 is additionally provided on at least one first side 20 of the thrust bearing 10. The lubricant pocket 18 is in this case arranged outside of the segment area 14. From the lubricant pocket 18 a lubricant feed line 22 is formed to the segment area 14 by providing a bore 24 which connects the lubricant pocket 18 to the segment area 14 in order to supply the latter with lubricant or, as the case may be, lubricating oil.

However, drilled bores 24 of this type as a lubricant feed line have the disadvantage, as already described above, that chips and burrs form, in which case the swarf produced is difficult to remove and can also lead to a constriction or even to a blockage of the drilled bore 24. A similar case also applies to the burrs. These, like the chips, have to be removed in an additional operating step in order to prevent them from protruding into the drilled bore 24, for example, and unintentionally constricting the latter, thereby resulting in a considerable deterioration in the efficiency of operation of the thrust bearing. However, such additional operating steps and a corresponding re-inspection of the thrust bearing or, as the case may be, of its lubricant feed line lead to additional costs.

Figure 2:
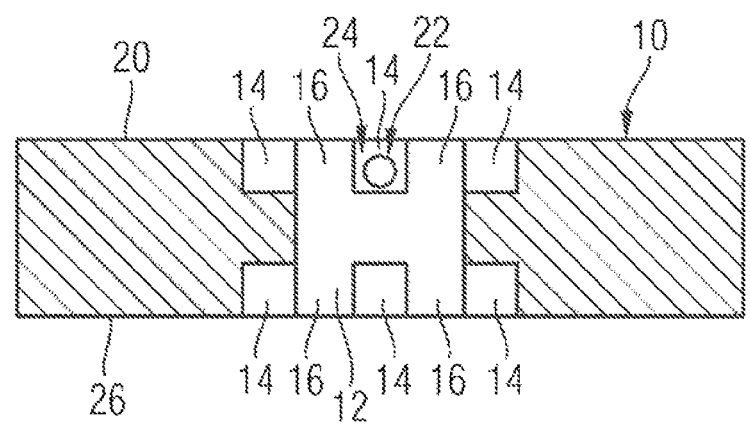
FIG. 2 shows a sectional view A-A of the thrust bearing according to FIG. 1, and FIGS. 3a-e show schematic sectional views of the steps involved in the production of a lubricant feed line of a thrust bearing according to the invention.

In FIG. 2 the thrust bearing 10 according to FIG. 1 is shown in a sectional view A-A. The segment area 14 is shown here in the form of a recess. Also shown are the segments 16 that are arranged in the segment area 14. The drilled bore 24 which connects the lubricant pocket 18 to the segment area 14 is also shown. The segment area 14 and the segments 16 are in this case provided on the first and second side 20, 26 of the thrust bearing 10.

According to the invention a thrust bearing 10 is provided which is comparable with that as depicted in FIGS. 1 and 2. In principle the thrust bearing 10 according to the invention can also have any other embodiment than that shown in FIGS. 1 and 2. The essential point is that the lubricant feed line 22 which connects a lubricant pocket 18 of the thrust bearing 10 to, for example, at least one segment area 14 is produced using a swarfless method, in contrast to the drilled channel 24 according to the prior art.

The steps of the method according to the invention are shown in FIGS. 3a to 3e.

Figure 3A:
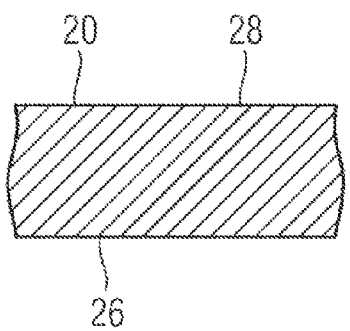

FIG. 3a first shows, for example, an essentially flat base material or, as the case may be, an initial thrust bearing mold 28, made of metal or a metal alloy, for example. The thickness of the base material or, as the case may be, of the initial mold 28 can in this case substantially correspond to the thickness of the finished thrust bearing 10 or be brought to the corresponding thickness subsequently.

In this connection it is possible for the initial thrust bearing mold 28 to have been already at least partially machined in order to form the subsequent finished thrust bearing 10. Subsequently to the embodiment of a lubricant feed line 32, further machining steps can optionally follow in this case in order to produce the finished thrust bearing. Alternatively the lubricant feed line 32 can also be realized as the final machining step or, for example, also as the first machining step at the start of the production of the thrust bearing 10, or as one of the first machining steps.

In other words the production of the lubricant feed line 32 is beneficially or, as the case may be, suitably incorporated into a sequence of machining steps for producing the thrust bearing 10 such that the thrust bearing can be produced, for example, easily and cost-effectively.

Figure 3B:
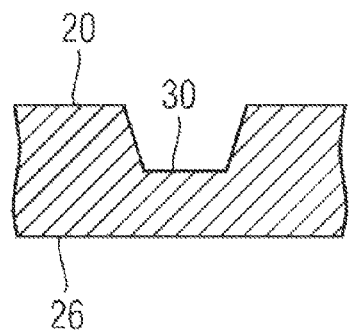

In a first step, as shown schematically in FIG. 3b, initially a groove 30 is now stamped on a first side 20 of the base material 28 on which the channel 32 is to be provided. In this case the groove 30 is stamped in such a way that it connects the lubricant pocket 18 to, for example, a segment area similar to that shown in FIG. 1, for example. As already stated hereintofore, the thrust bearing 10 in FIG. 1 is merely one example out of many of the embodiment of a thrust bearing 10.

Figure 3C:
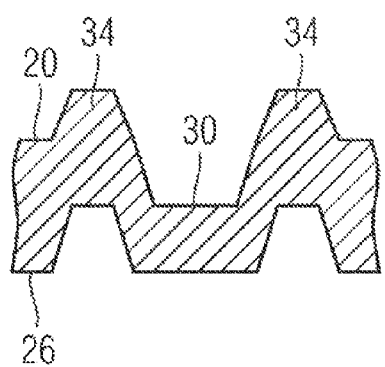

In a further step, as shown in FIG. 3c, material 34 is punched from the second side 26 of the base material 28 to the right and left of the groove 30 likewise by means of stamping. That is to say that material 34 is not simply displaced exclusively to the side, but essentially is pressed through or, as the case may be, pressed out or punched toward the first side 20 of the base material 28. This stamping of the base material from the second side 26 is performed over the entire length or at least over at least a part of the length of the groove 30 in order subsequently to form a channel 32 out of it. In this case the length can be chosen as a function of whether the channel 32 is to be embodied over its entire length, for example, as at least partially or completely closed or is to have, for example, at least one additional open section. The amount or, as the case may be, the height of the punched material on the right and left of the groove 30 can in this case be the same or different, according to function or intended use.

Figure 3D:
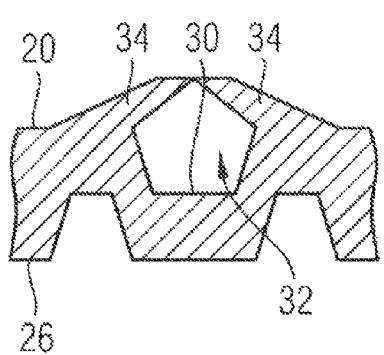

According to the next step, as shown in FIG. 3d, the material 34 previously pressed through to the first side 20 of the base material 28 is stamped together inwards, for example, toward the center of the groove 30 in order to embody the channel or, as the case may be, the lubricant feed line 32. In this case the material 34 projecting on the right- and left-hand side of the groove 30 is stamped together to such an extent that the material 34 comes together, for example, in the center in order to embody a channel or, as the case may be, lubricant feed line 32 that is essentially closed at the top.

Depending on function and intended use, the channel 32 can also be embodied as open at the top (not shown) or, as the case may be, as partially closed. In this case the material 34 that stands proud on the right and left of the groove 30 is stamped together only to the point where the channel 32 still remains at least partially open at the top or, as the case may be, is not completely closed.

In both cases, however, the material 34 initially protrudes from the first side 20 of the base material 28, as shown in the case of the variant having the closed channel 32 in FIG. 3d.

Figure 3E:
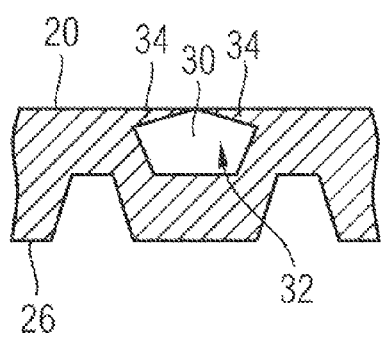

In an additional, next step, as shown schematically in FIG. 3e, the surface of the first side 20 is therefore leveled if necessary at least over the formed channel 32 or, as the case may be, the lubricant feed line such that an essentially flat surface is achieved. This means that the material 34 projecting upward in FIG. 3d is planed level over the groove 30. In the process the thickness can be adjusted to the thickness of the finished thrust bearing 10. The method and the thus obtained thrust bearing 10 have the advantage that in a small number of process steps a channel or, as the case may be, a lubricant feed line 32 can be produced which connects the lubricant pocket 18, for example, to the segment area, wherein no swarf or sharp burrs can be produced which have to be carefully removed in separate operating steps.

Although the present invention has been described heretofore with reference to the preferred exemplary embodiments, it is not limited thereto, but can be modified in a multiplicity of ways.

In this case the present invention is in particular not restricted to an embodiment of a thrust bearing 10 according to FIGS. 1 and 2, but can be applied to all possible embodiment variants of thrust bearings in which at least one channel is provided as a lubricant feed line. The thrust bearing 10 shown in FIGS. 1 and 2 is merely an example presented for the purpose of explaining the inventive principle in greater detail. In this connection the groove 30 as the lubricant feed line of the thrust bearing also does not necessarily have to have an angular cross-section as shown, for example, in FIG. 3e, but can have any shape of cross-section, for example round, oval etc.

Furthermore it is also conceivable, instead of punching through material 34 on both sides of the groove 30 as shown in FIG. 3c, to punch through material 34 on one side of the groove 30 only. In this case the material 34 on one side of the groove 30, as shown in FIG. 3d, can be punched toward the groove such that it together with the groove 30 forms a channel 32. If necessary the surface of the channel 30 can be leveled accordingly, as shown in FIG. 3e, if the material 34, after being punched through toward the groove 30, still stands proud of the surface of the thrust bearing 10 in an undesired manner as shown in FIG. 3d. Furthermore it is also conceivable to stamp the groove 30 or, as the case may be, the channel 32 to such a depth that the channel 32 connects a lubricant pocket to a segment area on the first and/or second side 20, 26 of the thrust bearing 10.

Furthermore the individual machining steps, as described hereintofore with reference to FIGS. 3b to 3e, can be performed not just sequentially. Instead, individual steps can also be combined or, as the case may be, performed in one operating step. Thus, for example, stamping the groove (FIG. 3B) and punching through the material (FIG. 3c), or, for example, stamping together the material (FIG. 3d) and leveling the surface (FIG. 3e)—to name two examples—can be implemented in one operating step.

Moreover, the thrust bearing 10 according to the invention can be used not only for turbochargers, but also in any other field in which thrust bearings are required to absorb axial forces.

The invention claimed is:

1. A method for producing a lubricant feed line in a thrust bearing, the lubricant feed line being embodied as a channel for guiding lubricant from a lubricant pocket of the thrust bearing, the method which comprises the following steps:
   a) providing an initial thrust bearing mold;
   b) stamping a groove into a first side of the initial thrust bearing mold in a region thereof in which the channel of the thrust bearing is to be located;
   c) stamping and pushing through material on a second side of the thrust bearing laterally on one or both sides of the groove and along at least one segment of the groove; and
   d) shaping the material laterally on a side of the groove toward the groove to thereby form the channel of the material together with the groove.

2. The method according to claim 1, wherein step d) comprises stamping the material on one side and/or on both sides of the groove so far toward the groove that the material together with the groove forms an open trench channel, an at least partially closed channel, or a completely closed channel.

3. The method according to claim 1, which further comprises:
   e) leveling the surface of the channel such that the thrust bearing has a planar channel.

4. The method according to claim 1, which comprises stamping the channel into the thrust bearing to a depth that is sufficient to connect a lubricant pocket to a segment section on a same side and/or on an opposite side of the thrust bearing.

* * * * *